US008396254B1

(12) United States Patent
Hickman

(10) Patent No.: US 8,396,254 B1
(45) Date of Patent: Mar. 12, 2013

(54) METHODS AND SYSTEMS FOR ESTIMATING A LOCATION OF A ROBOT

(75) Inventor: Ryan Hickman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/588,003

(22) Filed: Aug. 17, 2012

Related U.S. Application Data

(60) Provisional application No. 61/596,785, filed on Feb. 9, 2012.

(51) Int. Cl.
*G04K 9/00* (2006.01)
*G06F 7/66* (2006.01)
(52) U.S. Cl. .................... 382/106; 382/291; 700/245
(58) Field of Classification Search ............ 382/100, 382/103–107, 153–155, 162, 168, 173–180, 382/181, 189–194, 199, 206, 217–220, 232, 382/254, 274, 276, 284–291, 305, 312; 700/245; 345/642; 356/601
See application file for complete search history.

(56) References Cited

U.S. PATENT DOCUMENTS

| | | | | |
|---|---|---|---|---|
| 6,628,819 B1 * | 9/2003 | Huang et al. | .................. | 382/154 |
| 6,847,462 B1 * | 1/2005 | Kacyra et al. | ................. | 356/601 |
| 7,720,572 B2 * | 5/2010 | Ziegler et al. | ................. | 700/245 |
| 7,990,397 B2 * | 8/2011 | Bukowski et al. | ............ | 345/642 |
| 8,208,719 B2 * | 6/2012 | Gordon et al. | ................ | 382/154 |

OTHER PUBLICATIONS

Ekvall et al., Integrating Active Mobile Robot Object Recognition and SLAM in Natural Environments, SLAM in Natural Environments, IROS 06, 2006.
Elmogy et al., Robust Real-time Landmark Recognition for Humanoid Robot Navigation, Proceedings of the 2008 IEEE, International Conference on Robotics and Biomimetics, Bangkok, Thailand, Feb. 21-26, 2009.
Forss'en et al., Informed Visual Search: Combining Attention and Object Recognition, Robotics and Automation, 2008, ICRA 2008, IEEE International Conference, May 19-23, 2008.
Meger et al., Curious George: An Attentive Semantic Robot, IROS07 Workshop, San Diego, CA USA, Nov. 2007.
Ribes et al., Object-based Place Recognition for Mobile Robots Using Panoramas, Artificial Intelligence Research and Development (CCIA-2008), IOS Press, vol. 184, p. 388-397, 2008.

\* cited by examiner

*Primary Examiner* — Seyed Azarian
(74) *Attorney, Agent, or Firm* — McDonnell Boehnen Hulbert & Berghoff LLP

(57) ABSTRACT

Methods and systems for estimating a location of a robot are disclosed. In one embodiment, the method comprises a robot capturing range images indicating distances from the robot to a plurality of objects in an environment. The method further comprises transmitting to a server a query based on the range images, receiving from the server a mapping of the environment and, based on the distances and the mapping, estimating a location of the robot. In another embodiment, the method comprises receiving from a robot range images of an environment and, based on the range images, determining an inventory of objects in the environment. The method further comprises, based on the inventory, identifying the environment and transmitting to the robot a mapping of the environment.

21 Claims, 8 Drawing Sheets

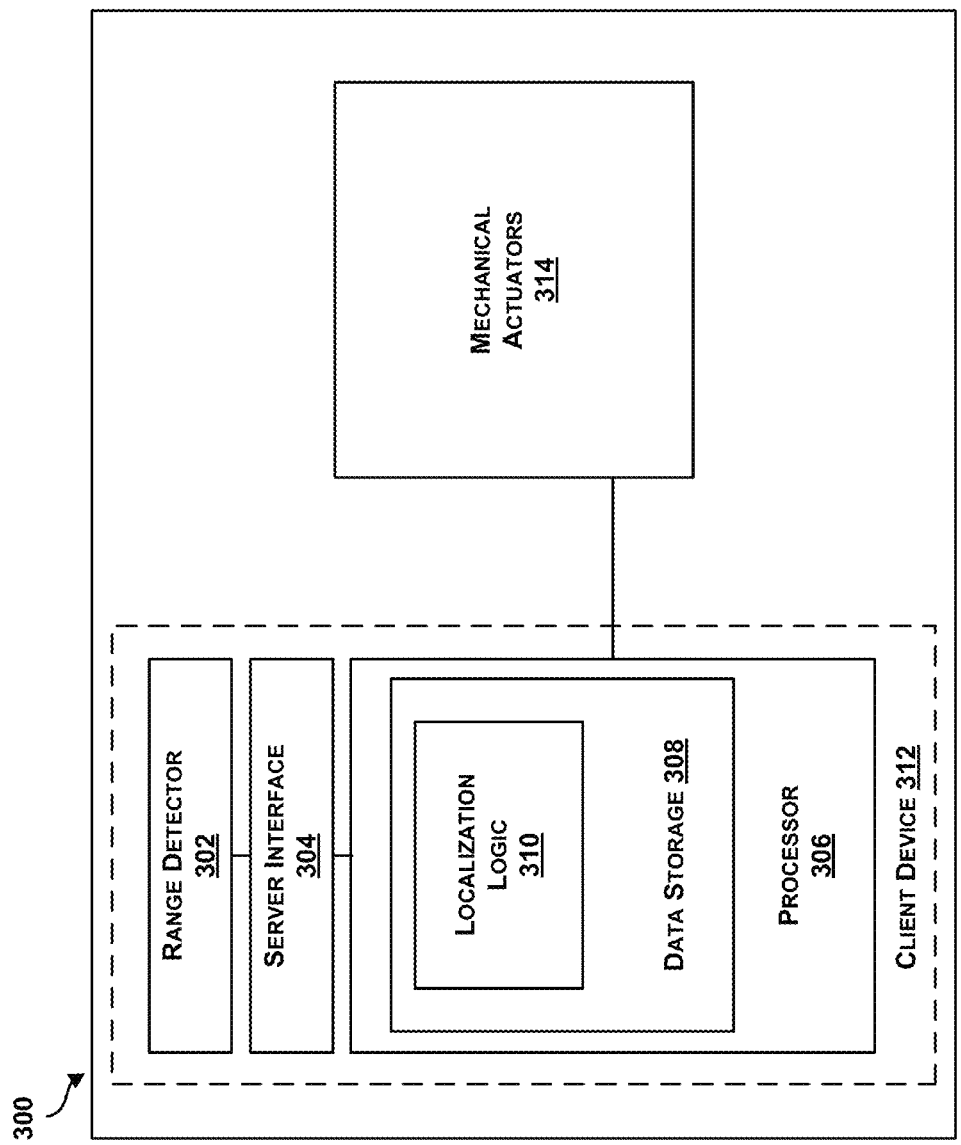

METHODS AND SYSTEMS FOR ESTIMATING A LOCATION OF A ROBOT

CROSS-REFERENCE TO RELATED APPLICATIONS

This application claims the benefit of U.S. Provisional Application No. 61/596,785 filed on Feb. 9, 2012, the entirety of which is herein incorporated by reference.

BACKGROUND

Robots may be equipped with detectors to capture images of objects in their surroundings. Further, robots may use one or more image analysis and/or image recognition techniques to identify the objects from the images.

SUMMARY

Methods and systems for estimating a location of a robot are disclosed. An example system may include a server and a robot. The robot may capture range images of objects in an environment, and may transmit to the server a query based on the range images. The server may use the range images to determine an inventory of the objects in the environment and, based on the inventory, may identify the environment. Then, the server may transmit to the robot a mapping of the environment. The robot may use the mapping and the range images to estimate a location of the robot.

In one embodiment, a method includes a robot capturing range images indicating distances from the robot to a plurality of objects in an environment, and transmitting to a server a query based on the range images. The method further includes receiving from the server a mapping of the environment and, based on the distances and the mapping, estimating a location of the robot.

In another embodiment, a method includes a server receiving from a robot range images of an environment and, based on the range images, determining an inventory of objects in the environment. The method further includes the server, based on the inventory, identifying the environment and transmitting to the robot a mapping of the environment.

In yet another embodiment, a robot includes a range detector configured to capture images indicating distances from the robot to a plurality of objects in an environment. The robot further includes at least one processor and data storage comprising localization logic. The localization logic is executable by the at least one processor to transmit to a server a query based on the range images, receive from the server a mapping of the environment, and, based on the distances and the mapping, estimate a location of the robot.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 3A is a simplified block diagram of an example robot.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The detailed description discloses, inter alia, methods and systems for estimating a location of a robot.

Figure 1:
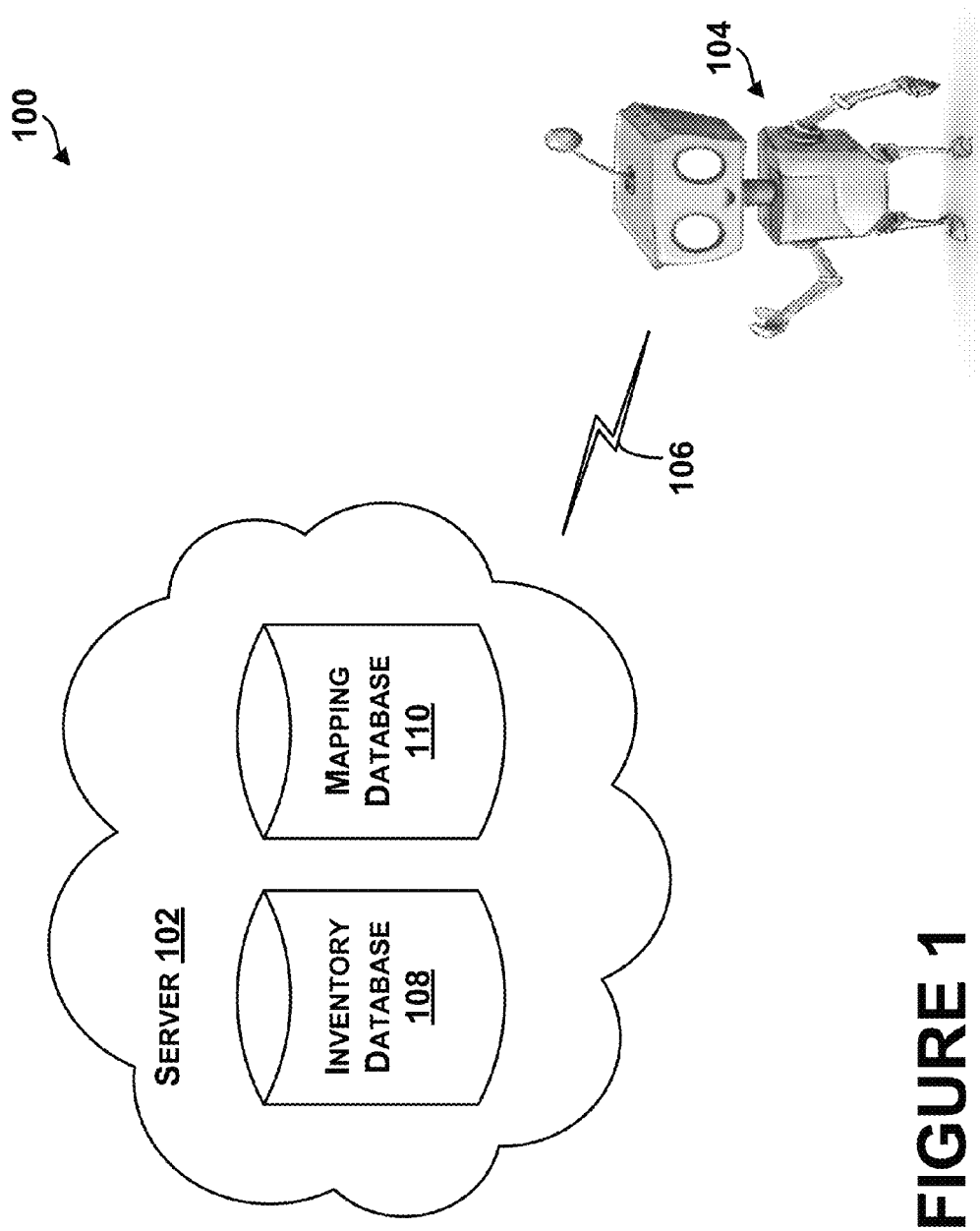
FIG. 1 is an example system for estimating a location of a robot.

FIG. 1 is an example system 100 for estimating a location of a robot 104. As shown, the system 100 includes a server 102. The system 100 further includes the robot 104, which is configured to send and receive data to/from the server 102 via a communication link 106.

While only one server 102 and one robot 104 are shown, more or fewer servers and/or robots are possible. For example, in some embodiments the system 100 may include more than one robot 104. Other examples are possible as well.

In addition, different types of devices, besides the robot 104, may be configured to communicate with the server 102. For example, any device that generally comprises one or more of a display system, memory, and a processor may be configured to communicate with the server 102.

The server 102 may be, for example, a computer or a plurality of computers on which one or more programs and/or applications are executed in order to provide one or more wireless and/or web-based interfaces that are accessible by the robot 104 via one or more communications networks.

As shown, the server 102 includes an inventory database 108. The inventory database 108 may include inventories for a number of environments. In particular, the inventory database 108 may include a number of inventories, each of which is associated with an environment. For example, the inventory database 108 may include an inventory for a kitchen in a particular house. The inventory of the kitchen may be associated with an indication of the kitchen and the particular house. As another example, the inventory database 108 may include an inventory for a particular office in a particular office building. The inventory of the office may be associated with an indication of the particular office and the particular office building. Other examples are possible as well. The inventories in the inventory database 108 may be generated in a number of ways.

In some embodiments, the inventories may be received from (or may be generated based on information received from) one or more robots or other devices in the system 100. For example, when a robot is in an environment, the robot may collect information about objects in the environment. For instance, the robot may capture images of objects and may use image analysis and/or image recognition techniques to identify the objects and may then send an indication of the environment and the identified objects to the server 102. In response, the server 102 may amend or create an inventory associated the environment to include the identified objects. Alternatively, the robot may capture images of objects in the environment and may amend or create an inventory associated the environment to include the identified objects. In these embodiments, the images and/or the identified objects may be approved by a user before being transmitted to the server 102.

In other embodiments, the inventories may be received from (or may be generated based on information received from) users. For example, a user may identify a number of objects in an environment, either by capturing images of the objects or by selecting the objects from a database of predefined objects. For instance, the user may capture images of the objects and may send an indication of the environment and the identified objects to the server 102 through, for example, a web-based interface. Alternatively, the user may send an indication of the environment and may select the objects from a database of predefined objects stored at (or otherwise accessible by) the server 102 through, for example, a mobile application running on a device used by the user. In either case, the server 102 may responsively amend or create an inventory associated the environment to include the identified objects.

The inventory database 108 may be generated in other ways as well.

The server 102 further includes a mapping database 110. The mapping database 110 may include mappings for a number of environments. In particular, the mapping database 110 may include a number of mappings, each of which is associated with an environment. For example, the mapping database 110 may include a mapping for the kitchen in the particular house from the example above. Similarly, the mapping database 110 may include a mapping for the particular office in the particular office building, as described above. Other examples are possible as well. The mappings in the mapping database 110 may take a number of forms.

In some embodiments, the mappings may comprise graphic mappings, in which the environment is graphically represented and a location of at least some of the objects is graphically indicated. For example, the mapping of the kitchen may appear similar to a blueprint of the kitchen, and a location of at least some of the objects from the inventory of the kitchen may be indicated on the mapping. For each indicated object, the location of the object may be indicated with text, such as a label indicating the object. Alternatively, the location of the object may be indicated with graphics, such as an image or a model of the object. The graphics may be provided by the robot or user, or may be predefined at the server 102 or another location and selected based on the identified object. For example, if the mapping of the kitchen includes an object identified as an oven made by a particular manufacturer, the mapping for the kitchen may include a three-dimensional model of an oven. The model may be predefined at the server 102, or may be predefined by a manufacturer of the oven. The locations of the objects may be indicated in other manners as well.

In other embodiments, the mappings may comprise list mappings. Each list mapping may include at least some of the objects in the environment respectively associated with a location of the objects. For example, the mapping of the kitchen may be a list of at least some of the objects from the inventory of the kitchen, and each object on the list may have an associated location. Other examples are possible as well.

In some embodiments, locations of all of the objects from the inventory may be indicated in the mapping. In other embodiments, locations of only a subset of the objects from the inventory may be indicated in the mapping. The subset may include, for example, objects whose location is less likely to vary (e.g., as compared with other objects from the inventory, or with objects in general), such as appliances and/or large furniture pieces. Alternatively or additionally, the subset may include, for example, objects that were more or sufficiently confidently identified by the robot and/or the server 102 using image analysis and/or image recognition techniques (e.g., as compared with other objects from the inventory, or with a confidence threshold). Still alternatively or additionally, the subset may include, for example, objects that are more likely to be consistently found in the environment or in a particular location in the environment (e.g., as compared with other objects from the inventory, or with objects in general). For example, if the environment is a kitchen, a refrigerator may be more likely to be consistently found in the environment than a sock. Other examples are possible as well. The subset may take other forms as well.

In some embodiments, the mapping may additionally include other types of information associated with the objects. For example, each object may be associated with instructions for use of the object and/or physical features of the object (such as a weight, size, color, material composition, or texture of the object). Other information is possible as well.

The mappings may take other forms as well.

The mappings in the mapping database 110 may be generated in a number of ways. In some embodiments, the mappings may be received from (or may be generated based on information received from) one or more robots or other devices in the system 100. For example, when a robot is in an environment, the robot may collect information about the environment. For instance, the robot may navigate through the environment to determine a location of objects in the environment and may send an indication of the environment and the locations of the objects to the server 102. In response, the server 102 may amend or create a mapping associated with the environment to include indications of the locations of the objects. In these embodiments, the indication of the environment and the objects may be approved by a user before being transmitted to the server 102.

In other embodiments, the mappings may be received from (or may be generated based on information received from) users. For example, a user may create or may select from a database a map of an environment. Then, the user may provide on the map indications of locations of the objects in the environment through, for example, a web-based interface. In response, the server 102 may amend or create a mapping associated with the environment to include indications of the locations of the objects. The mapping database 110 may be generated in other ways as well.

An example server is further described below in connection with FIG. 2.

The robot 104 may be any computing device that is configured to communicate with the server 102 and that has an actuation capability (e.g., electromechanical capabilities). The robot 104 may further be a combination of multiple computing devices.

An example robot is further described below in connection with FIGS. 3A-B.

As noted above, the system 100 may be used to estimate a location of the robot 104. To this end, the robot 104 may be configured to capture range images indicating distances from the robot 104 to a plurality of objects in an environment. Further, the robot 104 may be configured to transmit to the server 102 a query based on the range images. The robot 104 may transmit the query via, for example, the communication link 106.

The server 102 may be configured to receive the query and, based on the range images, determine an inventory of objects in the environment. Further, the server 102 may be configured to identify the environment based on the determined inventory. For example, the server 102 may be configured to select from the inventory database 108 an inventory that is similar to the determined inventory. Then, the server 102 may identify as the environment an environment that is associated with the inventory selected from the inventory database 108. Other examples are possible as well.

The server 102 may be further configured to transmit to the robot 104 a mapping of the identified environment. For example, the server 102 may be configured to select from the mapping database 110 a mapping that is associated with the identified environment, and may transmit the selected mapping to the robot 104. Other examples are possible as well. The server 102 may transmit the mapping via, for example, the communication link 106.

The robot 104 may be further configured to receive the mapping from the server 102. Then, based on the distances to the objects (as determined from the range images) and the locations of the objects (as determined from the mapping), the robot 104 may estimate a location of the robot 104. For example, the robot 104 may estimate the location of the robot 104 using at least one of triangulation and trilateration. Other examples are possible as well.

While communication link 106 is shown as a wireless communication link, in the system 100 the communication link 106 may be either a wired or wireless communication link. Example wired communication links include serial or parallel buses, twisted pair links, coaxial links, fiber optic links, or any other type of data communications or telecommunications link now known or later developed. Example wireless communication links include Bluetooth, IEEE 802.11 (IEEE 802.11 may refer to IEEE 802.11-2007, IEEE 802.11n-2009, or any other IEEE 802.11 revision), or other wireless based communication links now known or later developed.

Further, while the robot 104 is shown to communicate directly with the server 102, in some embodiments the system 100 may include access points through which the robot 104 may communicate with the server 102. Access points may take various forms, such as wireless access points (WAPs) or wireless routers. As another example, if the robot 104 connects using a cellular air-interface protocol, such as a CDMA or GSM protocol, access points may be base stations in a cellular network that provide Internet connectivity via the cellular network.

Figure 2:
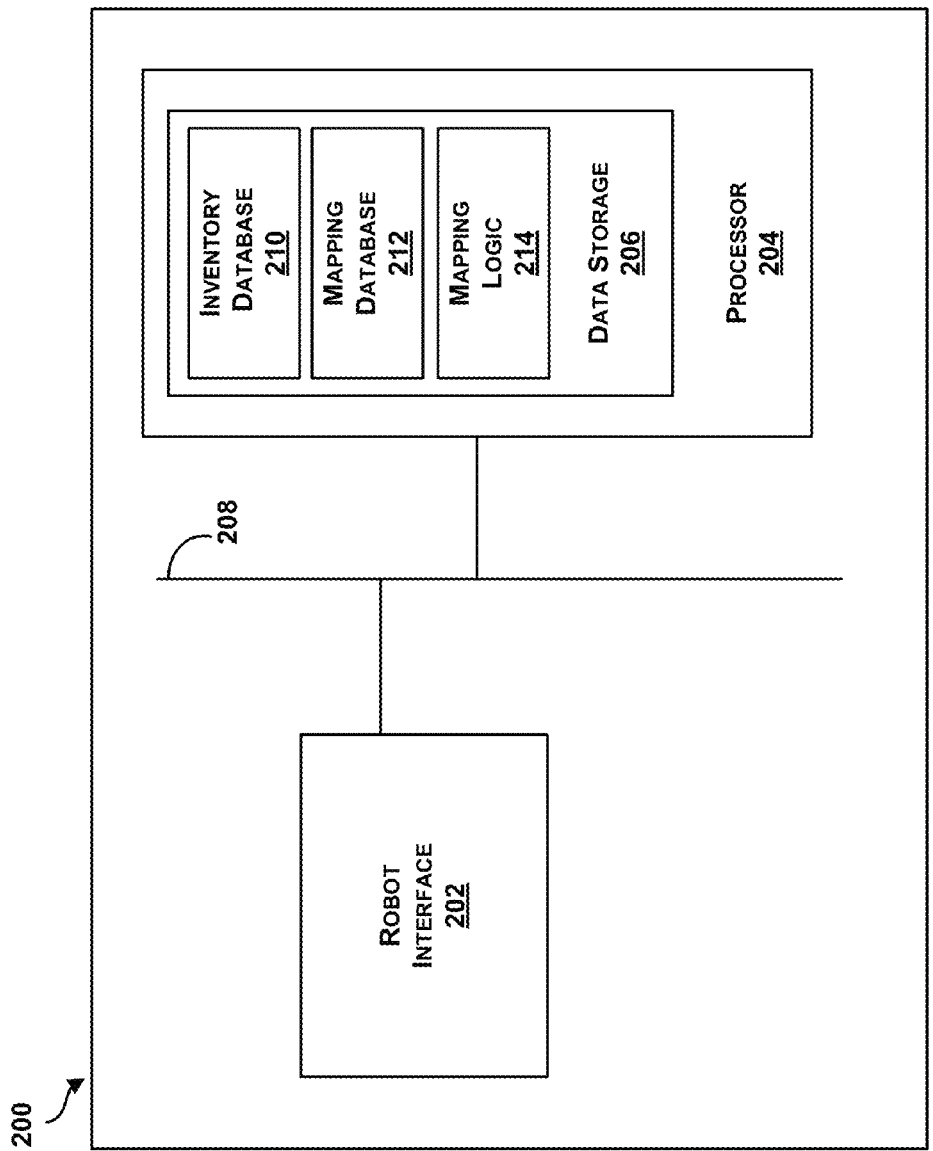
FIG. 2 is a simplified block diagram of an example server.

FIG. 2 is a simplified block diagram of an example server 200. As shown, the server 200 includes a robot interface 202, a processor 204, and data storage 206, all of which may be communicatively linked together by a system bus, network, and/or other connection mechanism 208. In some embodiments, many servers 200 may be configured to operate in concert to perform the disclosed methods in connection with many robots.

The robot interface 202 may be any interface configured to (1) receive range images of an environment (or a query based on such range images) from a robot (such as, for example, robot 104, as described above in connection with FIG. 1), and (2) transmit a mapping of the environment to the robot. In some embodiments, the robot interface 202 may be further configured to receive a recent location of the robot. Further, in some embodiments, the robot interface 202 may be further configured to transmit an inventory of objects in the environment to the robot.

The robot interface 202 may be any type of wireline or wireless interface. For example, the robot interface 202 may include an antenna and a chipset for communicating with the robot over an air interface. The chipset or robot interface 202 in general may be arranged to communicate according to one or more types of wireless communication (e.g., protocols), such as Bluetooth, communication protocols described in IEEE 802.11 (including any IEEE 802.11 revisions), cellular technology (such as GSM, CDMA, UMTS, EV-DO, WiMAX, or LTE), or Zigbee, among other possibilities. Alternatively or additionally, the robot interface 202 may be a web-based interface accessible by the robot. The robot interface 202 may take other forms as well.

In some embodiments, the server 200 may include one or more additional interfaces configured to receive data from one or more additional entities, such as other robots, other devices, or other servers via the Internet.

The processor 204 may comprise one or more general-purpose processors and/or one or more special-purpose processors. To the extent the processor 204 includes more than one processor, such processors could work separately or in combination. Further, the processor 204 may be integrated in whole or in part with the robot interface 202 and/or with other components.

Data storage 206, in turn, may comprise one or more volatile and/or one or more non-volatile storage components, such as optical, magnetic, and/or organic storage, and data storage 206 may be integrated in whole or in part with the processor 204.

Data storage 206 may configured to store the range images (or the query based on the range images) received from the robot. In embodiments where the robot interface 202 is further configured to receive a recent location of the robot, data storage 206 may be further configured to store the recent location. Further, in embodiments where the robot interface 202 is further configured to transmit an inventory of objects in the environment to the robot, data storage 206 may be further configured to store the inventory of objects.

Further, data storage 208 may contain an inventory database 210, which may be similar to the inventory database 108 described above in connection with FIG. 1. Data storage 208 may also contain a mapping database 212, which may be similar to the mapping database 110 described above in connection with FIG. 1. Data storage 208 may further contain mapping logic 214 executable by the processor 210 to carry out various server functions described herein, including those described below in connection with FIG. 6.

3. Example Robot Architecture

FIG. 3A illustrates a simplified block diagram of an example robot 300. As shown, the robot 300 includes a client device 312 coupled to mechanical actuators 314. The client device 312 may include a range detector 302, a server interface 304, a processor 306, and data storage 308.

The range detector 302 may be any detector configured to capture range images indicating distances from the robot to a plurality of objects in an environment. The range detector 302 may be, for example, a stereo camera, a structured-light scanner, a time-of-flight camera, a laser rangefinder camera, or another type of detector. In some embodiments, more than one range detector 302 may be used. The range images may be, for example, point-map images, point-cloud images, or other types of images.

In some embodiments, the range detector 302 may be configured to generate a two-dimensional image showing a distance from the range detector 302 to a number of points on the objects. To this end, the range detector 302 may use one or more range detecting techniques.

For example, the range detector 302 may use a structured light technique in which the robot 300 illuminates the objects with a predetermined light pattern, such as a grid or checkerboard pattern, and uses the range detector 302 to detect a reflection of the predetermined light pattern off the objects. Based on distortions in the reflected light pattern, the robot 300 may determine the distance to the points on the objects. The predetermined light pattern may comprise infrared light, or light of another wavelength.

As another example, the range detector 302 may use a laser scanning technique in which the robot 300 emits a laser and scans across a number of points on the objects. While scanning the objects, the robot 300 uses the range detector 302 to detect a reflection of the laser off the objects for each point. Based on a length of time it takes the laser to reflect off the objects at each point, the robot 300 may determine the distance to the points on the objects.

As yet another example, the range detector 302 may use a time-of-flight technique in which the robot 300 emits a light pulse and uses the range detector 302 to detect a reflection of the light pulse off the object at a number of points on the object. In particular, the first detector 302 may include a number of pixel sensors, and each pixel sensor may detect the reflection of the light pulse from a point on the object. Based on a length of time it takes the light pulse to reflect off the object at each point, the robot 300 may determine the distance to the points on the object. The light pulse may be a laser pulse.

Other range detecting techniques are possible as well, including stereo triangulation, sheet-of-light triangulation, interferometry, and coded aperture techniques, among others.

The range detector 302 may take other forms as well.

The server interface 304 may be any interface configured to (1) transmit to a server (such as, for example, the server 102 described above in connection with FIG. 1) a query based on the range images and (2) receive from the server a mapping of the environment. In some embodiments, the server interface 304 may be further configured to transmit to the server a recent location of the robot 300. Further, in some embodiments, the server interface 202 may be further configured to receive from the server an inventory of objects in the environment.

The server interface 304 may be any type of wireline or wireless interface. For example, the server interface 304 may include an antenna and a chipset for communicating with the server over an air interface. The chipset or server interface 304 in general may be arranged to communicate according to one or more types of wireless communication (e.g., protocols), such as Bluetooth, communication protocols described in IEEE 802.11 (including any IEEE 802.11 revisions), cellular technology (such as GSM, CDMA, UMTS, EV-DO, WiMAX, or LTE), or Zigbee, among other possibilities. The server interface 304 may take other forms as well.

In some embodiments, the robot 300 may include one or more additional interfaces configured to receive data from one or more additional entities, such as other robots, other devices, or other servers via the Internet.

The processor 306 may comprise one or more general-purpose processors and/or one or more special-purpose processors. To the extent the processor 306 includes more than one processor, such processors could work separately or in combination. Further, the processor 306 may be integrated in whole or in part with the range detector 302, the server interface 304, and/or with other components.

Data storage 308, in turn, may comprise one or more volatile and/or one or more non-volatile storage components, such as optical, magnetic, and/or organic storage, and data storage 308 may be integrated in whole or in part with the processor 306.

Data storage 308 may be configured to store the range images and the query based on the range images. Further, data storage 308 may be configured to store a mapping received from the server. In embodiments where the server interface 302 is further configured to transmit to the server a recent location of the robot 300, data storage 308 may be further configured to store the recent location. Further, in embodiments where the server interface 302 is further configured to receive from the server an inventory of the objects, data storage 308 may be further configured to store the inventory.

Data storage 308 may further contain localization logic 310 executable by the processor 306 to carry out various robot functions described herein, including those described below in connection with FIG. 4.

The robot 300 may include one or more additional components instead of or in addition to those shown. For example, the robot 300 may include one or more additional sensors beyond the range detector 302. Example sensors on the robot 300 may include any of gyroscopes, accelerometers, Global Positioning System (GPS) receivers, infrared sensors, optical sensors, biosensors, Radio Frequency identification (RFID) systems, wireless sensors, and/or compasses, among others, for example. As another example, the robot 300 may include or may be connectable to one or more user-interface (UI) devices that allows a user to interact with the robot 300. Example UI devices include buttons, touchscreens, and microphones. Other UI devices are possible as well. As still another example, the robot 300 may include or may be connectable to a display, such as a liquid crystal display, a light-emitting diode display, an electroluminescent display, or other display. In some embodiments, the display may be a touchscreen, such that the display also serves as a UI device for the robot 300.

In some embodiments, the client device 312 may be a module that can be physically connected to and disconnected from the robot 300. For example, the client device 312 may be a mobile device or tablet computer. However, the client device 312 need not be physically attachable or detachable from the robot 300 in all embodiments. Other examples are possible as well.

In some embodiments, the client device 312 may be configured to physically connect to the robot 300, such as by sitting on a "chest" of the robot 300 to form an interactive display. In other embodiments, the client device 312 may be configured to wirelessly connect to the robot 300 through, for example, a Bluetooth or WiFi connection. Other wireless technologies are possible as well.

In some embodiments, one or more of the range detector 302, the server interface 304, the processor 306, and the data storage 308 may be modules that can be removably connected to the client device 312 and/or the robot 300. By varying the modules connected to the robot 300, the abilities, functions, and power consumption of the robot 300 can be varied.

In embodiments where one or more of the range detector 302, the server interface 304, the processor 306, and the data storage 308 are modules, any of the modules may be interconnected, and/or may communicate to receive data or instructions from each other so as to provide a specific output or functionality for the robot 300.

The mechanical actuators 314 may include a moveable base, motors, wheels, movable arms, and/or other elements that enable robot 300 to move in and/or interact with the environment.

Figure 3B:
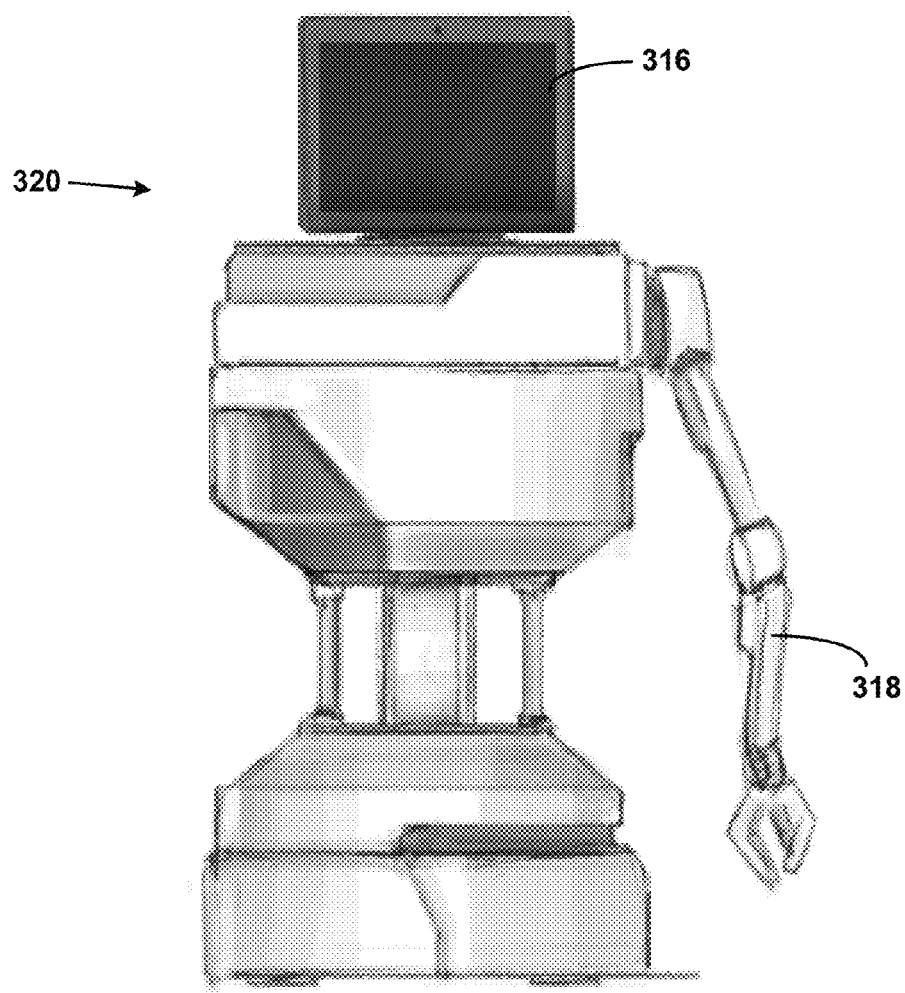
FIG. 3B illustrates a graphical example of a robot.

FIG. 3B illustrates a graphical example of a robot 320. In FIG. 3B, the robot 320 includes a client device 316 and a mechanical actuator 318. In this example, the client device 316 may be a mobile device or a tablet computer. Other examples are possible as well. The mechanical actuator 318 may include the arm, the base, wheels, and a motor. In some embodiments, such as the one shown in FIG. 3B, the client device 316 can be positioned on the mechanical actuator 318. The robot 320 may be configured in other ways as well.

Either of the robots 300 and 320 may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

Figure 4:
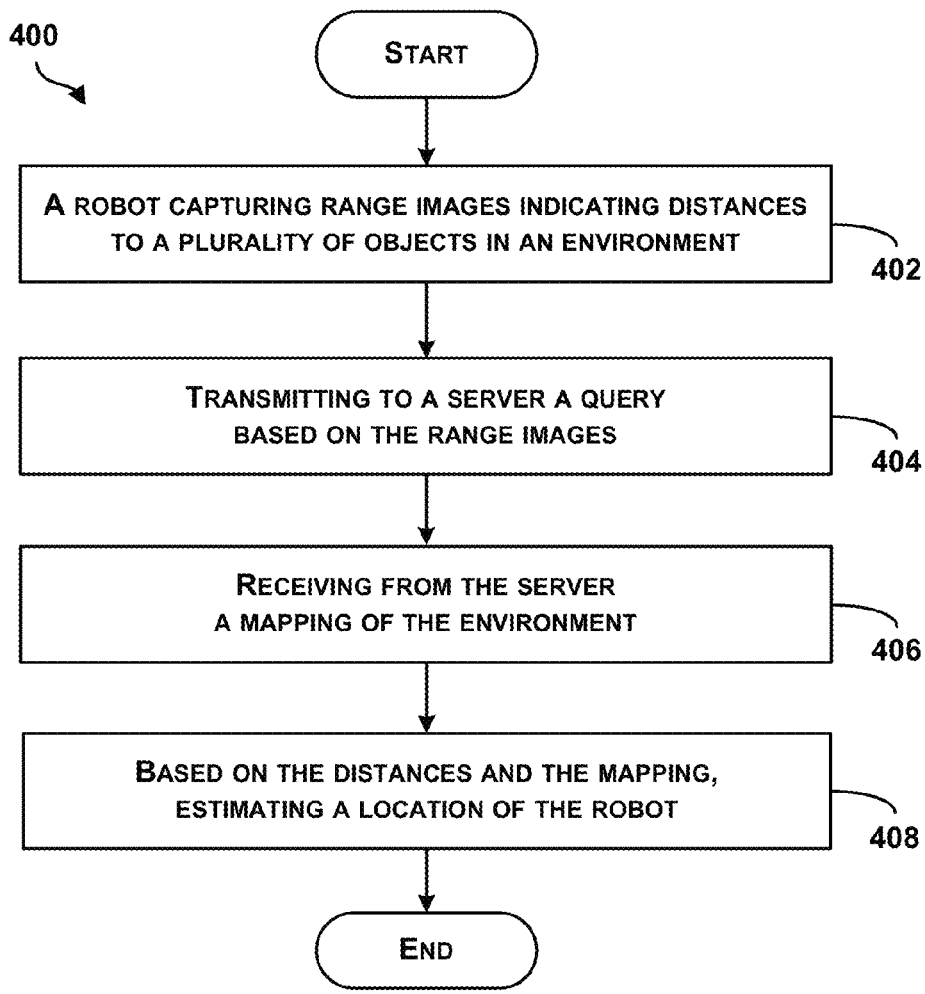
FIG. 4 is a block diagram of an example robot method for estimating a location of the robot.

FIG. 4 is a block diagram of an example robot method 400 for estimating a location of the robot.

Method 400 shown in FIG. 4 presents an embodiment of a method that, for example, could be used with any of the systems, devices, and servers described herein. Method 400 may include one or more operations, functions, or actions as illustrated by one or more of blocks 402-408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of some of the present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that store data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 400 and other processes and methods disclosed herein, each block may represent circuitry that is wired to perform the specific logical functions in the process.

As shown, the method 400 begins at block 402 where a robot captures range images indicating distances from the robot to a plurality of objects in an environment. The robot may capture the images using, for example, a range detector, such as the range detector 302 described above in connection with FIG. 3. The range images may be, for example, point-map images, point-cloud images, or other types of images.

In some embodiments, the robot may capture the range images in response to a trigger, such as a command from a user or a determination that the robot needs to determine its location (e.g., to carry out a particular function). In other embodiments, the robot may capture the range images periodically, in an effort to periodically estimate its location. In still other embodiments, the robot may capture the range images in response to a determination that more than a threshold period of time has passed since the robot last estimated its location. The robot may capture the images in other manners as well.

The robot may capture any number of range images. In some embodiments, the robot may rotate in a circle and may capture range images at predetermined intervals around the circle. In other embodiments, the robot may capture a predetermined number of range images, or may capture range images of a predetermined number or objects. The robot may capture other numbers of images as well.

The method 400 continues at block 404 where the robot transmits to a server a query based on the images. The query may take several forms. In some embodiments, the query may comprise the range images themselves. In other embodiments, the robot may use one or more image analysis and/or image recognition techniques on the range images, and the query may comprise data derived from range images through the image analysis and/or image recognition techniques. The data may include, for example, feature points of the range images and/or an indication of at least some of the objects shown in the range images. Other examples are possible as well. In still other embodiments, the robot may determine a recent location of the robot, and the query may comprise the recent location of the robot, along with the range images and/or data derived from the range images. The recent location may be, for example, a location of the robot determined the last time the robot could connect to a GPS or other location server, or the last time the robot could otherwise determine its location. Other examples are possible as well. The query may take other forms as well.

At block 404, the robot receives from the server a mapping of the environment. As noted above, the mapping may take several forms. In some embodiments, the mappings may comprise graphic mappings, in which the environment is graphically represented and a location of at least some of the objects is graphically indicated. In other embodiments, the mappings may comprise list mappings. Each list mapping may include at least some of the objects in the environment respectively associated with a location of the objects. In some embodiments, locations of all of the objects in the environment, while in other embodiments, locations of only some of the objects in the environment may be indicated. In some embodiments, the mapping may additionally include other types of information associated with the objects. The mapping may take other forms as well.

In some embodiments, along with the mapping, the robot may receive an inventory of the objects in the environment. The inventory may include information about the objects such as, for example, instructions for use of the objects and/or physical features of the objects (such as a weight, size, color, material composition, or texture of the objects). Other information is possible as well.

The method 400 continues at block 406 where, based on the distances and the mapping, the robot estimates a location of the robot. In particular, based on the locations of at least some of the objects, as determined from the mapping, and the distances from the robot to the object, the robot may estimate the location of the robot. In some embodiments, the robot may estimate the location of the robot using one of trilateration and triangulation. These techniques are described in connection with FIGS. 5A and 5B.

Figure 5A:
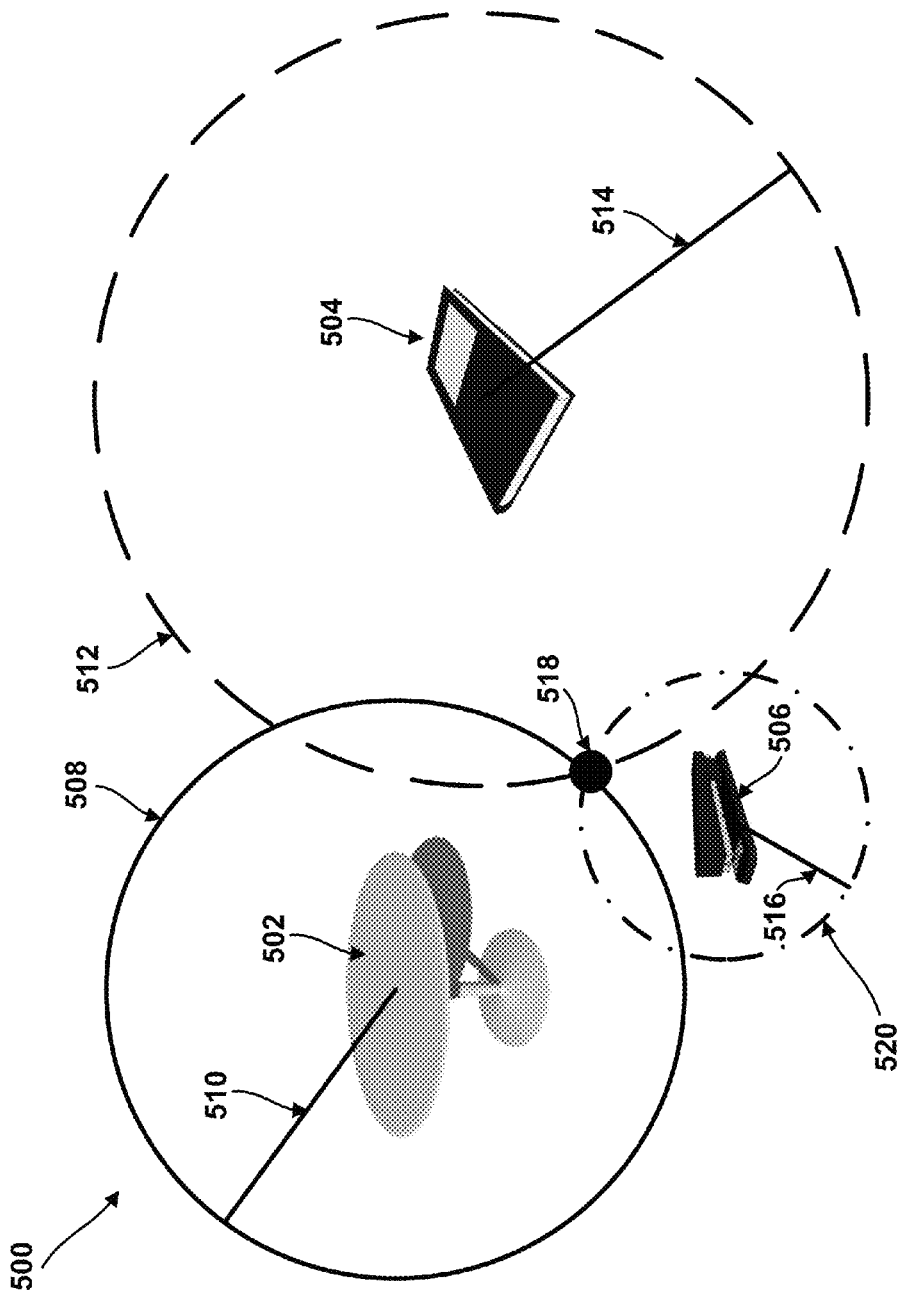
FIG. 5A illustrates estimating a location of a robot using trilateration.

FIG. 5A illustrates estimating a location of a robot using trilateration. As shown, a robot 518 is located in an environment 500 that includes a first object 502, a second object 504, and a third object 506. While the first, second, and third objects 502, 504, 506 are shown as particular objects, it is to be understood that these particular objects are merely exemplary, and that other objects are possible as well.

The robot 518 may capture a range image of the first object 502. From the range image, the robot 518 may determine a distance 510 to the first object 502. Similarly, the robot 518 may capture a range image of the second object 504 and, from the range image, may determine a distance 514 to the second object 504. Further, the robot 518 may capture a range image of the third object 506 and, from the range image, may determine a distance 516 to the third object 506.

The robot 518 may further transmit to a server a query based on the range images, and may receive from the server a mapping of the environment 500 that indicates a location of the first object 502, the second object 504, and the third object 506.

From the location of the first object 502, and the distance 510 from the robot 518 to the first object 502, the robot 518 may determine a first set of potential locations 508 of the robot 518. As shown, the first set of potential locations 508 comprises the perimeter of a circle centered at the location of the first object 502 and having a radius equal to the distance 510 from the robot 518 to the first object 502.

Similarly, from the location of the second object 504, and the distance 514 from the robot 518 to the second object 504, the robot 518 may determine a second set of potential locations 512 of the robot 518. As shown, the second set of potential locations 512 comprises the perimeter of a circle centered at the location of the second object 504 and having a radius equal to the distance 514 from the robot 518 to the second object 504.

Further, from the location of the third object 506, and the distance 516 from the robot to the third object 506, the robot 518 may determine a third set of potential locations 520 of the robot 518. As shown, the third set of potential locations 520 comprises the perimeter of a circle centered at the location of the third object 506 and having a radius equal to the distance 516 from the robot 518 to the third object 506.

As shown, the first set of potential locations 508, the second set of potential locations 512, and the third set of potential locations 520 have a single intersection. The robot 518 may thus estimate the location of the robot 518 to be at this intersection.

Figure 5B:
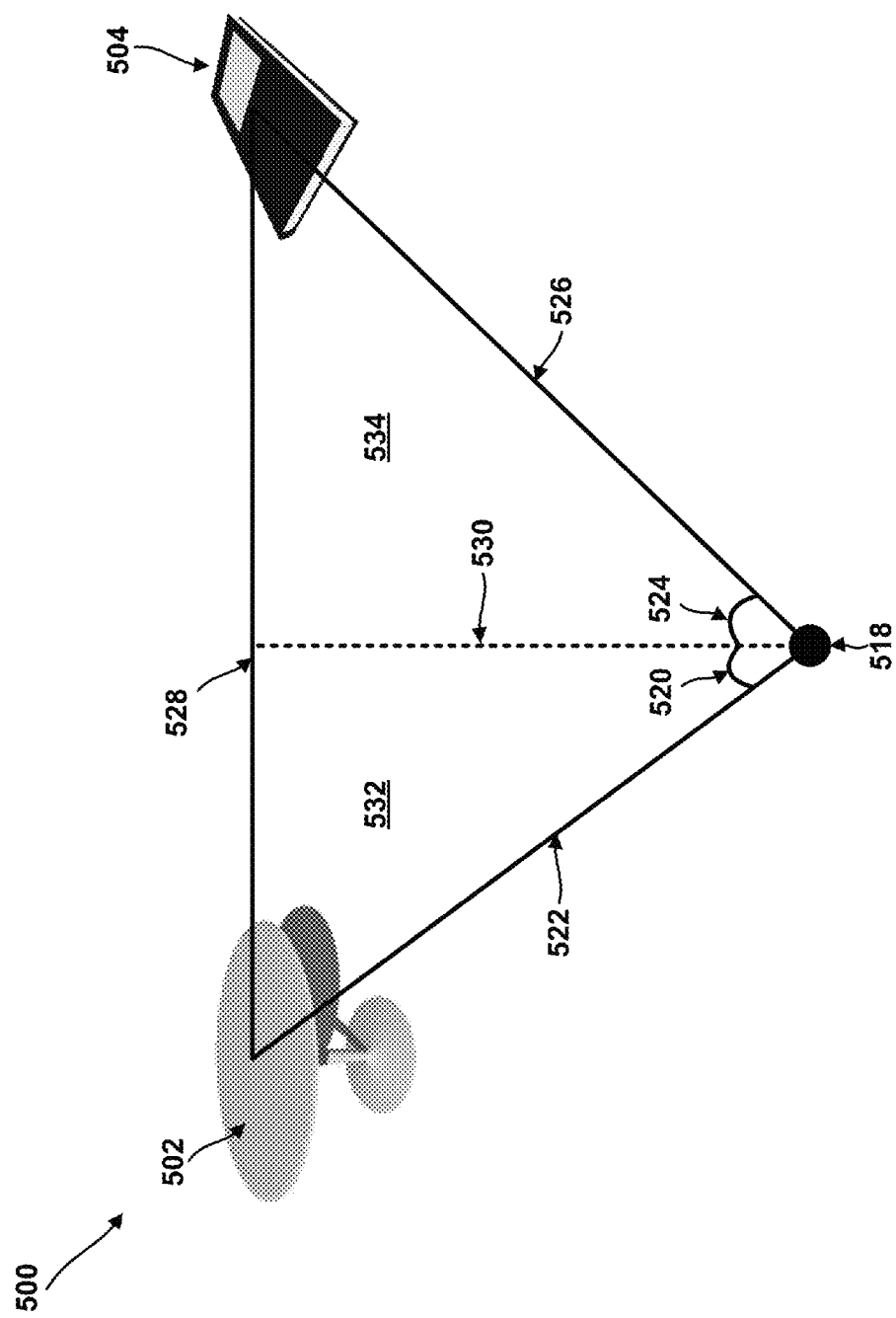
FIG. 5B illustrates estimating a location of a robot using triangulation.

FIG. 5B illustrates estimating a location of a robot using triangulation. As shown, a robot 518 is located in an environment 500 that includes a first object 502 and a second object 504. While the first and second objects 502, 504 are shown as particular objects, it is to be understood that these particular objects are merely exemplary, and that other objects are possible as well.

From a first orientation, the robot 518 may turn at an angle 520 and may capture a range image of the first object 502. From the range image, the robot 518 may determine a distance 522 from the robot 518 to the first object 502.

Then, from the first orientation, the robot 518 may turn at an angle 524 and may capture a range image of the second object 504. From the range image, the robot 518 may determine a distance 526 from the robot 518 to the second object 504.

The robot 518 may further transmit to a server a query based on the range images, and may receive from the server a mapping of the environment 500 that indicates a location of the first object 502 and the second object 504.

From the locations of the first object 502 and the second object 504, the robot may determine a line 528 that intersects both locations. The line 528, the line along which the robot 518 captured the range image of the first object 502 (having the distance 522), and the line along which the robot 518 captured the range image of the second object 504 (having the distance 526) may form a triangle, as shown. The robot 518 may further identify a line 530 along the first orientation of the robot 518 from the robot 518 to the line 528. As shown, the line 530 divides the triangle into a first right triangle 532 and a second right triangle 534.

From either of the first right triangle 532 or the second right triangle 534, the robot 518 may estimate a location of the robot 518. For example, if the first object 502 has a location (x,y), the first angle 520 has a value $\alpha$, and the distance 522 from the robot 518 to the first object 502 has a distance L, the robot 518 may estimate its location to be given by (x+L $\sin \alpha$, y−L $\cos \alpha$). Other examples are possible as well.

The robot may estimate its location in other manners as well.

Figure 6:
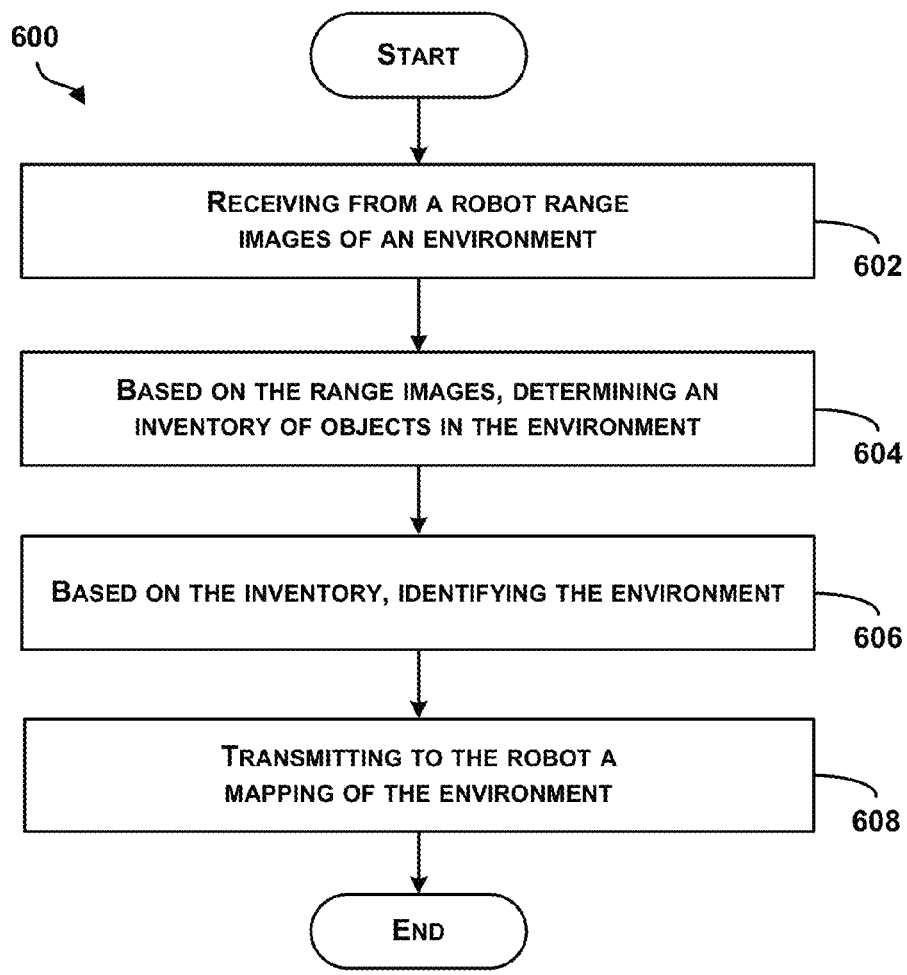
FIG. 6 is a block diagram of an example server method for estimating a location of a robot.

FIG. 6 is a block diagram of an example server method for estimating a location of a robot.

As shown, the method 600 begins at block 602 where a server receives from a robot range images of an environment. The range images may take any of the forms described above. In some embodiments, rather than receiving the range images themselves, the server may receive data derived from the range images through, for example, image analysis and/or image recognition techniques. For example, the server may receive feature points of the range images and/or an indication of at least some of the objects shown in the range images. Other examples are possible as well. Further, in some embodiments, the server may receive a recent location of the robot along with the range images (or the data derived from the range images).

The method 600 continues at block 604 where, based on the range images, the server determines an inventory of objects in the environment. To this end, the server may perform image analysis and/or image recognition on the range images to identify objects in the range images. The inventory may then comprise a listing of the objects. In embodiments where the server received an indication of at least some of the objects shown in the range images, the inventory may comprise a listing of the objects. The server may determine the inventory in other manners as well.

The method 600 continues at block 606 where, based on the inventory, the server identifies the environment. In some embodiments, this may involve the server maintaining an inventory database comprising inventories associated with environments. The inventory database may, for example, be similar to the inventory database 108 described above in connection with FIG. 1. Using the inventory determined from the range images, the server may select from the inventory database an inventory that is similar to the determined inventory. The similarity of the inventories may be based on a number of common objects (where all objects are given the same weight, or where certain objects (e.g., those whose location is less likely to vary, those that were more or sufficiently confidently identified by the server, those that are more likely to be consistently found in the environment, etc.)

are given more weight). The server may then identify as the environment an environment associated with the inventory selected from the database.

In some embodiments, the inventory database may be arranged according to types of environments. For example, the inventory may include inventories for kitchen-type environments, living-room-type environments, classroom-type environments, office-type environments, etc. In these embodiments, the server may use the inventory determined from the range images to first select a type of environment, and then may search within that type of environment for an inventory that is similar to the determined inventory. The server may then identify as the environment an environment associated with the inventory selected from the database. In some cases, arranging the inventory database according to types of environments may improve the efficiency of the searching.

The server may identify the environment in other manners as well.

At block 608, the server transmits to the robot a mapping of the identified environment. In some embodiments, this may involve the server maintaining a mapping database comprising mappings associated with environments. The mapping database may, for example, be similar to the mapping database 110 described above in connection with FIG. 1. Using the environment identified from the inventory, the server may select from the mapping database a mapping that is associated with the identified environment and may transmit the mapping to the robot. In some embodiments, the robot may additionally transmit the inventory to the robot. The mapping may take any of the forms described above.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A robot comprising:
a range detector configured to capture range images indicating distances from the robot to a plurality of objects in an environment, wherein the range images comprise at least one of point-map images and point-cloud images; and
at least one processor configured to (i) initiate the transmission of a query to a server, wherein the query is based at least in part on the range images, (ii) receive a mapping of the environment from the server, wherein the mapping of the environment comprises an indication of a location of at least some of the objects in the plurality of objects in the environment and (iii) estimate a location of the robot based at least in part on the distances and the mapping.

2. The robot of claim 1, wherein the range detector comprises one of a stereo camera, a structured light scanner, a time-of-flight camera, and a laser rangefinder camera.

3. The robot of claim 1, further comprising a server interface configured to transmit the query to the server and receive the mapping from the server.

4. The robot of claim 3, wherein the server interface comprises a wireless interface.

5. The robot of claim 3, wherein the server interface comprises a web-based interface.

6. The robot of claim 1, wherein estimating the location of the robot comprises using triangulation to estimate the location of the robot.

7. The robot of claim 1, wherein estimating the location of the robot comprises using trilateration to estimate the location of the robot.

8. A method comprising:
a robot capturing range images indicating distances from the robot to a plurality of objects in an environment, wherein the range images comprise at least one of point-map images and point-cloud images;
transmitting to a server a query based at least in part on the range images;
receiving from the server a mapping of the environment, wherein the mapping of the environment comprises an indication of a location of at least some of the objects in the plurality of objects in the environment; and
based on the distances and the mapping, estimating a location of the robot.

9. The method of claim 8, wherein the range images comprise at least one of point-map images and point-cloud images.

10. The method of claim 8, wherein the query is further based on a recent location of the robot.

11. The method of claim 8, wherein the mapping comprises an indication of a location of at least some of the objects in the plurality of objects.

12. The method of claim 8, wherein estimating the location of the robot comprises using at least one of triangulation and trilateration to estimate the location of the robot.

13. A method comprising:
receiving range images of an environment from a robot, wherein the range images comprise at least one of point-map images and point-cloud images;
based on the range images, determining an inventory of objects in the environment;
based on the inventory, identifying the environment; and
transmitting a mapping of the environment and the inventory of objects in the environment to the robot.

14. The method of claim 13, wherein the range images comprise at least one of point-map images and point-cloud images.

15. The method of claim 13, further comprising:
based at least in part on the range images, identifying objects in the environment; and
based at least in part on the identified objects, determining the inventory.

16. The method of claim 13, wherein the inventory of the objects in the environment includes instructions for use of the objects.

17. The method of claim 13, further comprising receiving from the robot a recent location of the robot.

18. The method of claim 17, wherein identifying the environment comprises:
based at least in part on the inventory, determining a type of environment; and based at least in part on the inventory and the type of environment, identifying the environment.

19. The method of claim 13, wherein the mapping comprises an indication of a location of at least some of the objects in the plurality of objects.

20. A computer-readable medium having stored therein instructions that, when executed by a computing device, cause the computing device to perform functions comprising:
- receiving range images of an environment from a robot, wherein the range images comprise at least one of point-map images and point-cloud images;
- based on the range images, determining an inventory of objects in the environment;
- based on the inventory, identifying the environment; and
- transmitting a mapping of the environment and the inventory of objects in the environment to the robot.

21. The computer-readable medium of claim 20, wherein the functions further comprise:
- based at least in part on the range images, identifying objects in the environment; and
- based at least in part on the identified objects, determining the inventory.

* * * * *